US012615296B2

(12) United States Patent
Arora et al.

(10) Patent No.: US 12,615,296 B2
(45) Date of Patent: Apr. 28, 2026

(54) DYNAMIC UPDATES TO CLOUD ACCESS POLICIES

(71) Applicant: MICROSOFT TECHNOLOGY LICENSING, LLC, Redmond, WA (US)

(72) Inventors: Prasidh Arora, Seattle, WA (US); Balaji Kottaram, Vancouver (CA); Mohit Kumar Garg, Sunnyvale, CA (US); Benjamin Martin Schultz, Bellevue, WA (US); Manoj K. Ampalam, Sammamish, WA (US); Masato Maeda, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 821 days.

(21) Appl. No.: 17/844,645

(22) Filed: Jun. 20, 2022

(65) Prior Publication Data

US 2023/0412642 A1     Dec. 21, 2023

(51) Int. Cl.
*H04L 9/40*             (2022.01)

(52) U.S. Cl.
CPC .......... *H04L 63/20* (2013.01); *H04L 63/0853* (2013.01); *H04L 63/105* (2013.01)

(58) Field of Classification Search
CPC ... H04L 63/20; H04L 63/0853; H04L 63/105; H04L 63/102
See application file for complete search history.

(56) References Cited

U.S. PATENT DOCUMENTS 9,521,151 B2     12/2016  Kinsella et al.
10,230,764 B2     3/2019  Ng et al.
(Continued)

FOREIGN PATENT DOCUMENTS

AU        2017275464 B2     8/2021
CA        2591933 C         1/2014
CA        3027212 A1        6/2019

OTHER PUBLICATIONS

Yang, et al., "Enabling Efficient Access Control with Dynamic Policy Updating for Big Data in the Cloud", In proceedings of IEEE Conference on Computer Communications, Apr. 27, 2014, pp. 1-9.

*Primary Examiner* — Amie C. Lin
(74) *Attorney, Agent, or Firm* — Newport IP, LLC; Jacob P. Rohwer

(57)                ABSTRACT
The techniques described herein implement a proxy service associated with a public cloud platform. A proxy server receives a connection request sent via an account. The connection request includes a connection parameter such as a specific time the request is initiated, a specific location of a device used to initiate the request, or an identification of the device used to initiate the request. The proxy server maps the account to a policy. The proxy server then determines whether the connection parameter included in the request is anomalous to a corresponding parameter defined in the policy. In an event the connection parameter is an anomalous parameter, the proxy server takes actions to determine whether the policy can be dynamically updated to accommodate the anomalous parameter. If an accommodation can be made, a user or device does not have to wait an extended period of time to gain access to the resource.

20 Claims, 8 Drawing Sheets

(56) References Cited

U.S. PATENT DOCUMENTS

| | | | |
|---|---|---|---|
| 10,917,439 | B2 | 2/2021 | Puratthepparambil et al. |
| 11,258,827 | B2 | 2/2022 | Biswas et al. |
| 2013/0097709 | A1* | 4/2013 | Basavapatna ....... H04L 63/1441 |
| | | | 726/25 |
| 2018/0034701 | A1 | 2/2018 | Nagesh et al. |
| 2018/0288063 | A1* | 10/2018 | Koottayi ................. G06F 21/50 |
| 2019/0081968 | A1* | 3/2019 | Wang ................... H04L 63/102 |
| 2020/0112568 | A1* | 4/2020 | Pereira ................... G06N 20/00 |
| 2021/0407220 | A1 | 12/2021 | Fang et al. |
| 2023/0179634 | A1* | 6/2023 | Seaborn ............... H04L 63/101 |
| | | | 726/1 |

\* cited by examiner

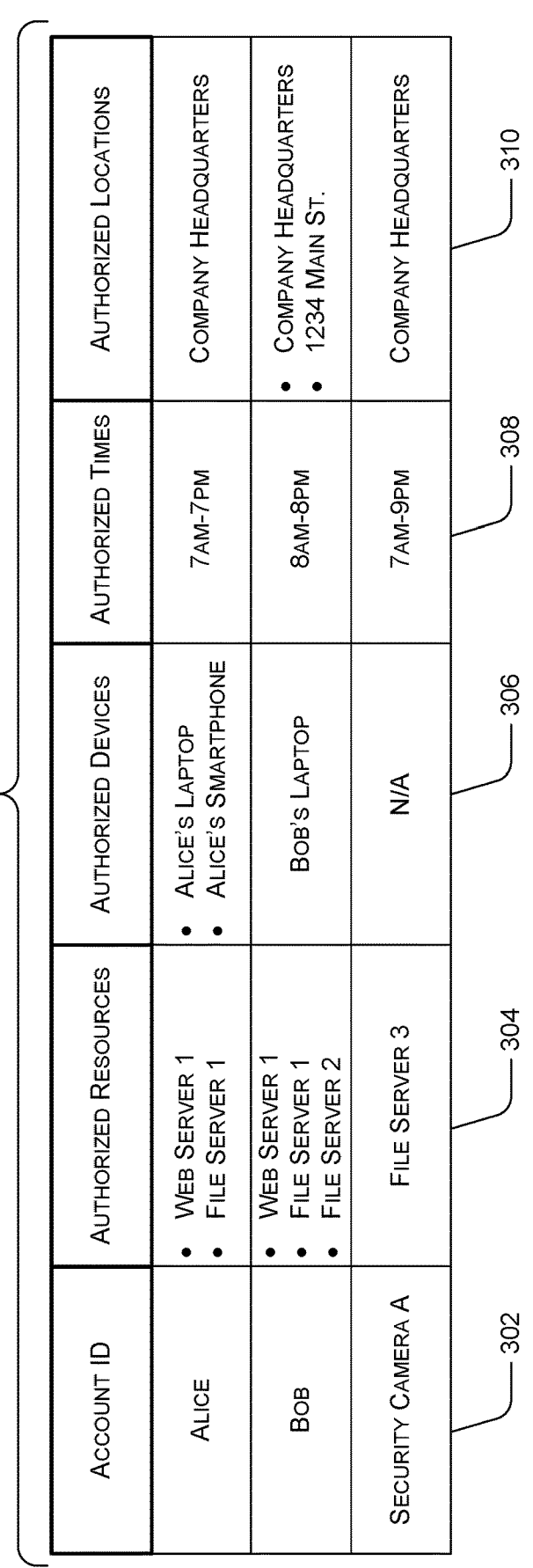

POLICY TABLE
300

| ACCOUNT ID | AUTHORIZED RESOURCES | AUTHORIZED DEVICES | AUTHORIZED TIMES | AUTHORIZED LOCATIONS |
|---|---|---|---|---|
| ALICE | • WEB SERVER 1<br>• FILE SERVER 1 | • ALICE'S LAPTOP<br>• ALICE'S SMARTPHONE | 7AM-7PM | COMPANY HEADQUARTERS |
| BOB | • WEB SERVER 1<br>• FILE SERVER 1<br>• FILE SERVER 2 | BOB'S LAPTOP | 8AM-8PM | • COMPANY HEADQUARTERS<br>• 1234 MAIN ST. |
| SECURITY CAMERA A | FILE SERVER 3 | N/A | 7AM-9PM | COMPANY HEADQUARTERS |

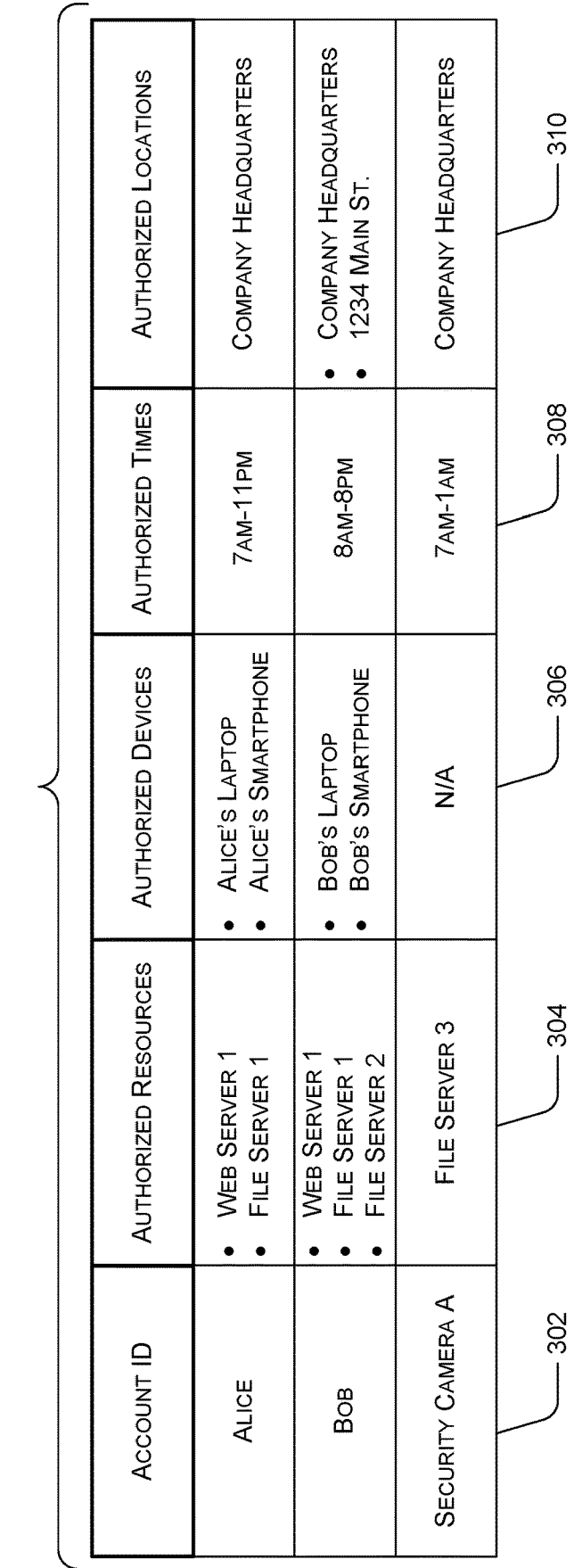

POLICY TABLE
300

| ACCOUNT ID | AUTHORIZED RESOURCES | AUTHORIZED DEVICES | AUTHORIZED TIMES | AUTHORIZED LOCATIONS |
|---|---|---|---|---|
| ALICE | • WEB SERVER 1<br>• FILE SERVER 1 | • ALICE'S LAPTOP<br>• ALICE'S SMARTPHONE | 7AM-11PM | COMPANY HEADQUARTERS |
| BOB | • WEB SERVER 1<br>• FILE SERVER 1<br>• FILE SERVER 2 | • BOB'S LAPTOP<br>• BOB'S SMARTPHONE | 8AM-8PM | • COMPANY HEADQUARTERS<br>• 1234 MAIN ST. |
| SECURITY CAMERA A | FILE SERVER 3 | N/A | 7AM-1AM | COMPANY HEADQUARTERS |
| 302 | 304 | 306 | 308 | 310 |

FIG. 3B

DYNAMIC UPDATES TO CLOUD ACCESS POLICIES

BACKGROUND

As cloud computing grows, there is an increased importance for entities (e.g., enterprises, organizations, government agencies) to develop information technology (IT) capabilities and to move the execution of workloads (e.g., applications, programs, processes, functions) from on-premises resources located in the office, in private datacenters, at retail sites, at factory sites, etc., to resources in the public cloud (e.g., GOOGLE CLOUD, AMAZON WEB SERVICES, MICROSOFT AZURE). The decision related to where workloads are executed may be based on privacy, security, compliance, auditing, or other purposes.

These entities create static policies to secure access to resources in the public cloud and to protect against malicious actors (e.g., cyber attackers). Provided a set of parameters associated with a connection request, a static policy determines whether a user has access to a certain cloud resource. If the static policy rejects access due to an unexpected parameter, the user is unable to access the cloud resource at the time a connection is requested. Further, the user must wait until a manual policy review process is implemented by management of an entity to gain access to the cloud resource provided a scenario that causes the unexpected parameter. Manual policy review processes are a burden on management, and therefore, are not frequently implemented (e.g., once every two weeks, once a month). Consequently, the user often has to wait a long period of time to gain access to the cloud resource provided a scenario that causes the unexpected parameter.

To further exacerbate this issue, changes in cloud resource configuration and/or user status occur often (e.g., daily). Changes may be caused by various factors including, for example, the introduction and configuration of a new cloud resource, the scaling up and/or down of a cloud service, the maintenance of a cloud resource related to an unexpected event, different user work hours, different user work locations, and different user work devices. These changes can lead to justifiable reasons for a user to access a particular cloud resource, and in many scenarios, this access may be urgent. However, due to a relatively "old" static policy created for the user, the user access to the particular cloud resource is still rejected.

SUMMARY

The techniques disclosed herein dynamically update policies that govern (e.g., allow or reject) connections to resources configured in the public cloud. The dynamic updating of policies occurs in association with a connection request, and thus, a user no longer has to wait an extended period of time for a manual policy review process to occur before being allowed access to a cloud resource. An entity, as described above, defines a policy for a specific user. Alternatively, the entity can define the policy for a specific group of users that share an attribute (e.g., the same employment position, the same company office, the same company department). Additionally, the entity can define a policy for a specific machine, such as an Internet of Things (IoT) device. By dynamically updating policies when connection requests are received, the techniques are able to efficiently respond to changes that often occur (e.g., daily).

A policy may define parameters that limit access, for an account, to a cloud resource. In one example, the parameters define specific times (e.g., a time range) when the account is authorized to access the cloud resource. In another example, the parameters define specific locations from which the account is authorized to access the cloud resource. In yet another example, the parameters define specific devices that are authorized for the account to access the cloud resource.

In one example, the account is a user account. In this example, a user is present at a device (e.g., laptop device, tablet device, desktop device, smartphone device, head-mounted display device) and logs in to the account to perform tasks for the entity (e.g., an enterprise) based on interactions with the device. In another example, the account is a device account. In this example, a user is not present at a device (e.g., an IoT device). Rather, the device automatically activates (e.g., turns on) and performs preconfigured tasks (e.g., a security camera is turned on at a specific time to capture and process video at an entrance to company headquarters).

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 3A illustrates an example policy table useable to allow or reject a connection request.

FIG. 3B illustrates an example policy table that is dynamically updated to allow a connection request that was previously rejected.

DETAILED DESCRIPTION

Figure 1:
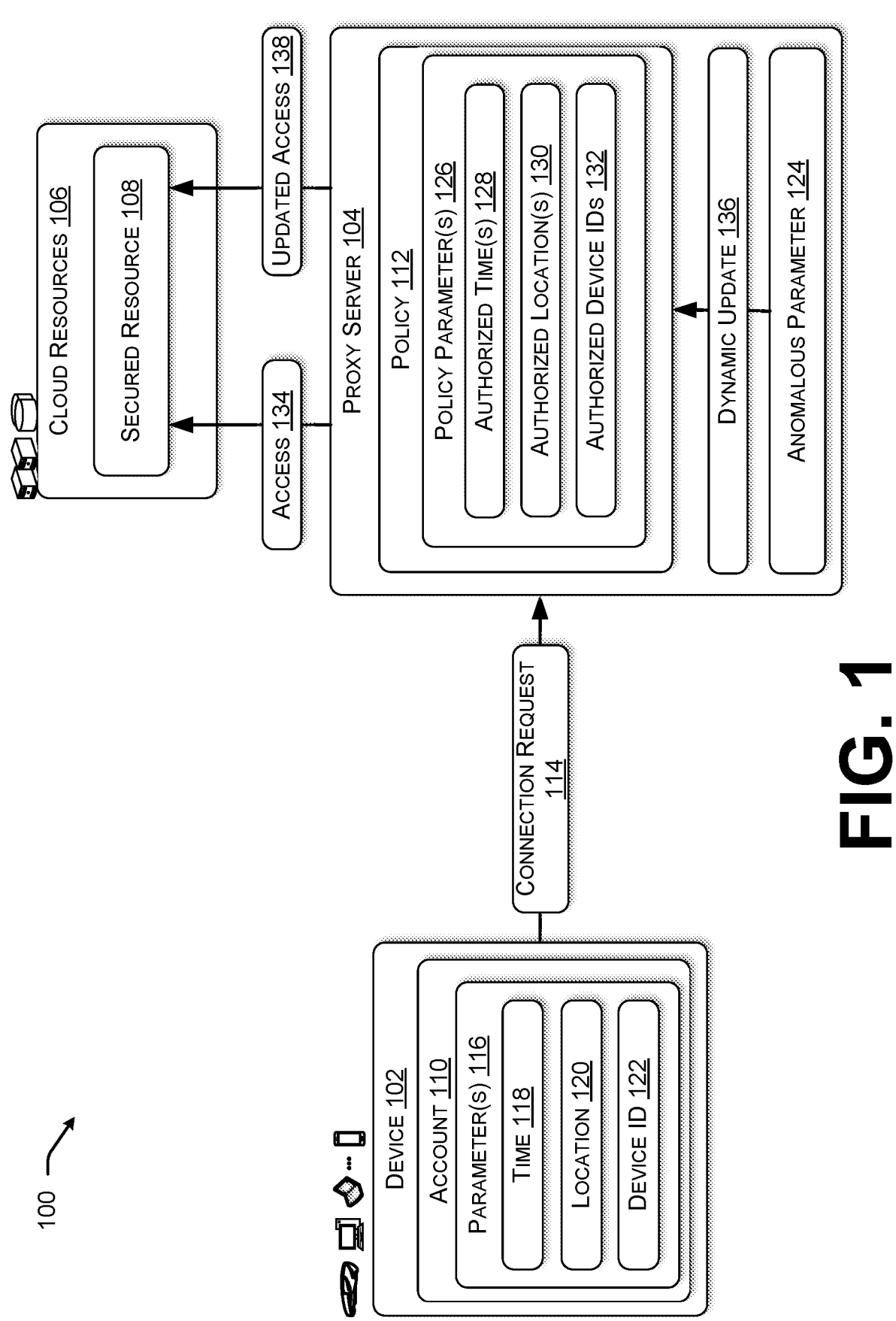
FIG. 1 illustrates an example environment in which a policy applied to an account that initiates a connection request for access to a cloud resource is dynamically updated to accommodate an anomalous parameter.

The system described herein implements a proxy service associated with a public cloud platform. Thus, the system includes a proxy server that manages access to resources in the public cloud by applying policies to connection requests. Accordingly, a proxy server receives a connection request sent via an account. The connection request includes at least one connection parameter such as a specific time the connection request is initiated, a specific location of a device executing the account used to initiate the connection request, or an identification of the device executing the account used to initiate the connection request. Moreover, the connection request includes an identifier for a specific cloud resource to be accessed via the account.

The proxy server maps the account (e.g., an account identification) to a policy to be applied to the connection request. The proxy server then determines whether the connection parameter included in the connection request is an anomalous parameter. A connection parameter included in the connection request is an anomalous parameter if the connection parameter violates a parameter of the policy (e.g., a connection parameter value deviates from expected parameter values). For example, if a specific time when the connection request is initiated is not within an authorized time range, then the parameter of the policy is violated and the specific time is an anomalous parameter. In another example, if a specific location of a device executing the account used to initiate the connection request is not an authorized location, then the parameter of the policy is violated and the specific location is an anomalous parameter. In yet another example, if an identification of the device executing the account used to initiate the connection request is not an authorized device identification, then the parameter of the policy is violated and the identification of the device is an anomalous parameter.

In an event the connection parameter is not an anomalous parameter, the proxy server allows access to the cloud resource via the account and a connection between the device and the cloud resource is established. However, in the event the connection parameter is an anomalous parameter, the proxy server is configured to take actions to determine whether the policy can be dynamically updated to accommodate the anomalous parameter of the connection request. If an accommodation can be made, the device (e.g., a user) does not have to wait an extended period of time to gain access to the cloud resource via the account.

As described herein, the proxy server is configured to retrieve and/or analyze data to determine a risk associated with the anomalous parameter. For example, the proxy server uses a machine learning algorithm to predict a risk value associated with the anomalous parameter. In this example, the risk value represents a probability that the anomalous parameter is associated with an illegitimate or a non-justifiable access. To this end, the machine learning algorithm is configured to normalize a probability range for the risk value (e.g., zero to one hundred) and output a risk value associated with one or multiple anomalous parameters associated with a single connection request.

If the risk value satisfies a risk tolerance threshold value (e.g., is less than the risk tolerance threshold value), the proxy server dynamically updates the policy (e.g., automatically updates the policy) to accommodate the anomalous parameter. The risk tolerance threshold value can be established by the proxy server based on input from the entity, a confidentiality indicator associated with the cloud resource to be accessed, and/or a status of the account requesting access to the cloud resource. In contrast, if the risk value does not satisfy the risk tolerance threshold value (e.g., is greater than or equal to the risk tolerance threshold value), the connection request is rejected and the proxy server denies access to the cloud resource via the account.

Accordingly, the techniques described herein are configured to determine whether a policy applied to an account that initiates a connection request for access to an identified cloud resource can be dynamically updated, rather than simply deny the connection request due to an anomalous parameter.

FIG. 1 illustrates an example environment 100 in which a policy applied to an account that initiates a connection request for access to a cloud resource is dynamically updated to accommodate an anomalous parameter. As shown, the environment 100 includes a device 102, a proxy server 104, and cloud resources 106. In one example, the environment 100 captures a scenario where an entity (e.g., an enterprise, an organization, a government agency) has moved the execution of workloads (e.g., applications, programs, processes, functions) from on-premises resources (e.g., servers) located in the office, in private datacenters, at retail sites, at factory sites, etc., to the resources 106 in the public cloud.

In one example, a user involved with the entity employs the device 102 to access a secured resource 108 to perform certain tasks (e.g., employment responsibilities). To this end, the entity configures user devices and different user accounts for participating users (e.g., employees, volunteers, students) and registers the user accounts with the proxy server 104.

In another example, the device 102 is of a type that does not require a user to be present in order to request access to a cloud resource (e.g., an Internet of Things (IoT) device). Rather, the device 102 automatically activates (e.g., turns on) and performs preconfigured tasks. In a specific example, the device 102 is a security camera that is programmed to turn on when motion is detected to capture and process video at an entrance to company headquarters.

Accordingly, the proxy server 104 is configured to manage access to the cloud resources 106 for an account 110 executing on a device. As described above, the account 110 can be a user account or a device account. The proxy server 104 may be deployed at an edge of a cloud-platform (e.g., a datacenter) in which the cloud resources 106 are configured.

In one example, a user logs in to the account 110 executing on the device 102. Again, as described above, the account 110 may be an account created and/or registered by the information technology (IT) department of an entity. Therefore, the account 110 provides a mechanism for the user to access cloud resources 106 that execute workloads on behalf of the entity. In various examples, the log in process includes a Kerberos authentication protocol or an open authorization ("Oauth") protocol.

Furthermore, the proxy server 104 can be configured to implement custom access methods to a set of resources for a specific entity. For instance, the proxy server 104 can provide the entity with a custom set of identities, a custom set of encryption methods, a custom set of certificates and keys, a custom set of connectivity protocols, and so forth. These custom access methods may be dynamically applied when a given account 110 requests access to a specific resource. Moreover, these custom access methods help prevent users or devices outside the entity from accessing the specific resource. Just in time (JIT) and just enough administration (JEA) are techniques that limit resource access to authorized users.

Some of the cloud resources 106 are configured as secured cloud resource(s) 108 in the sense that access is governed by a policy 112 applied at and by the proxy server 104. The proxy server 104 applies the policy 112 to a connection request 114 received from the device 102 via the account 110. The connection request 114 includes at least one connection parameter 116. For example, a connection parameter 116 can include a specific time 118 the connection request 114 is initiated. In another example, a connection parameter 116 can include a specific location 120 of the device 102 at the time the connection request 114 is initiated. In yet another example, a connection parameter can include a device identification (ID) 122 of the device 102 used to send the connection request 114.

Upon receiving the connection request 114, the proxy server 104 maps the account 110, and by association the connection request 114, to the policy 112. The proxy server 104 then applies the policy 112 to the connection request 114 to determine whether the connection parameter 116 included in the connection request 114 is an anomalous parameter 124.

A connection parameter 116 included in the connection request 114 is an anomalous parameter 124 if the connection parameter 116 violates a policy parameter 126 of the policy 112 (e.g., a connection parameter value deviates from expected parameter values). For example, if the specific time 118 when the connection request 114 is initiated is not an authorized time 128 (e.g., within an authorized time range), then a violation occurs and the specific time 118 is an anomalous parameter 124. In another example, if the specific location 120 of the user device 102 at the time the connection request 114 is initiated is not an authorized location 130, then a violation occurs and the specific location 120 is an anomalous parameter 124. In yet another example, if a device ID 122 is not an authorized device ID 132, then a violation occurs and the device ID 122 is an anomalous parameter 124.

In the event the connection parameter 116 is not an anomalous parameter 124, the proxy server 104 allows immediate access 134 to the secured resource 108 identified in the connection request 114. Accordingly, a connection between the device 102 and the secured resource 108 is established via the account 110.

However, in the event the connection parameter 116 is determined to be an anomalous parameter 124 based on application of the policy 112 to the connection request 114, the proxy server 104 is configured to take actions to determine whether a dynamic update 136 can be made to the policy 112 to accommodate the anomalous parameter 124. This determination is described herein with respect to FIGS. 2A and 2B. If the policy 112 is dynamically updated to accommodate the anomalous parameter 124, the proxy server 104 allows updated access 138 to the secured resource 108 identified in the connection request 114. Consequently, the device 102 does not have to wait an extended period of time (e.g., until the parameter is no longer considered an anomalous parameter, until a manual policy review process is implemented by entity management) to gain access to the secured resource 108 via the account 110.

Figure 2A:
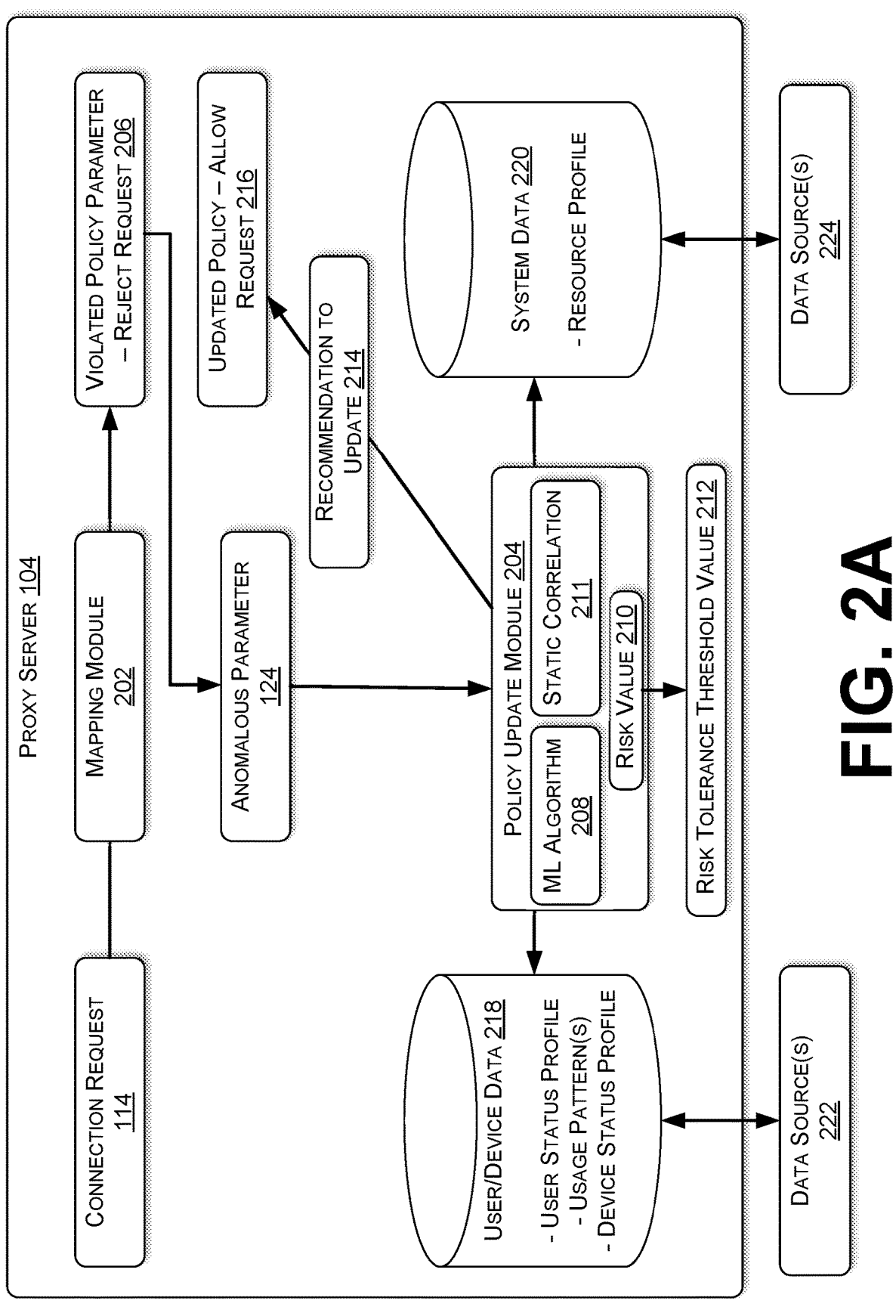
FIG. 2A illustrates example components, associated with a proxy server, that are executable to determine that a policy can be dynamically updated to accommodate the anomalous parameter.

FIG. 2A illustrates example components, associated with the proxy server 104, that are executable to determine that the policy 112 can be dynamically updated to accommodate the anomalous parameter 124. As shown, the proxy server 104 includes a mapping module 202 and a policy update module 204.

The mapping module 202 uses an identification of the account 110 (e.g., a username, an account number) to map the connection request 114 to the appropriate policy 112. For instance, the proxy server 104 maintains an in-memory set of policies that are useable to immediately check and grant access for different connection requests from different users and/or different devices if the checks return true (i.e., a policy parameter 126 is not violated). Prior to mapping the connection request 114 to the appropriate policy 112, the proxy server 104 may take action to ensure the connection request 114 is received from a legitimate source. For example, the proxy server 104 may verify the connection request 114 is associated with an entity subscription identification and/or a customer domain name. This verification reduces the risk of a denial-of-service attack.

The proxy server 104 is configured to implement a secure method for storing policies, which protects user information and resource access. For example, the connection parameter 116 is provided as metadata for the connection request 114 via an encrypted blob. Moreover, the policies can be stored in secure memory regions, e.g., using virtualization-based security (VBS), Software Guard Extensions (SGX), or ARM TrustZone. In this example, the policy and the encrypted metadata are compared in a secure manner (e.g., both are loaded into a secure memory region).

FIG. 2A illustrates that a policy parameter 126 is violated by a connection parameter 116, and thus, the connection request 114 is initially and temporally rejected 206. As described above, this violation results in the anomalous parameter 124. The anomalous parameter 124 is passed to the policy update module 204. The policy update module 204 is configured to determine whether the policy 112 can be dynamically updated to accommodate the anomalous parameter 124.

In one example, the policy update module 204 is configured to use a machine learning algorithm 208 to predict a risk value 210 associated with the anomalous parameter 124. In this example, the risk value 210 represents a probability that the anomalous parameter 124 is associated with an illegitimate or a non-justifiable access. To this end, the machine learning algorithm 208 is configured to normalize a probability range for the risk value (e.g., zero to one hundred).

In another example, the policy update module 204 is configured to statically correlate 211 a type of the anomalous parameter (e.g., connection requested at unauthorized time, connection requested from unauthorized location, connection requested via unauthorized device) to the risk value 210, which is predefined and statically configured for the type of anomalous parameter.

If the risk value 210 satisfies a risk tolerance threshold value 212 (e.g., is less than the risk tolerance threshold value 212), the policy update module 204 generates a recommendation to update 214 the policy 112. Accordingly, the policy 112 is automatically updated to accommodate the anomalous parameter 124 and, via the updated policy, the previously rejected connection request is now allowed 216. That is, the anomalous parameter 124 (e.g., an unauthorized device location, an unauthorized device ID, an unauthorized access time) can be added to the policy 112 temporarily or permanently.

The risk tolerance threshold value 212 can be established by the proxy server 104 based on input from the entity that issued and registered the account 110, a confidentiality indicator associated with the secured resource 108 to be accessed (e.g., a server that stores highly sensitive data may be less tolerant of risk compared to a server that stores moderately sensitive data), and/or a status of the user or the account 110.

The policy update module 204 is configured to access user/device data 218, system data 220, or both, in order to determine, using the machine learning algorithm 208, whether a recommendation to update the policy 214 can be made. The user/device data 218 may reflect recent changes to a user status related to a role (e.g., employment) and/or recent changes to the device 102. For example, changes can be stored in a user status profile. The user status profile may indicate a new employment position (e.g., a promotion which provides the user with increased security clearance to access more sensitive cloud resources), a new employment responsibility (e.g., a new task for which data is stored on cloud resources the user was not allowed to access previously), different user work hours (e.g., the user may have recently switched from working days to working nights), different user work locations (e.g., the user may have recently moved from one apartment to another apartment), different user work devices (e.g., the entity may have registered a new laptop device to the user for working from home purposes), and so forth.

As explained in the examples above, the new employment position and/or the new employment responsibility may have a clear association with the secured resource 108 the user is attempting to access. Thus, these types of user/device data 218 can be strong indicators to recommend a dynamic update 214 to the policy 112 because the risk is limited. The different user work hours, the different work locations, and the different user work devices may have a clear association with the anomalous parameter 124. Similarly, these types of user/device data 218 can be strong indicators to recommend the dynamic update 214 to the policy 112 because the risk is limited.

In a further example, the user status profile may include a preauthorization to accommodate the anomalous parameter. For instance, a supervisor of the user may preauthorize an extra hour of access for a given period of time (e.g., every day, every week). The user/device data 218 can reflect this preauthorization to accommodate the anomalous parameter 124 associated with receiving a connection request 114 at a time 118 that is outside a time range 132 authorized by the policy 112.

The user/device data 218 may also include cloud resource usage patterns for the account 110. The proxy server 104 can be configured to monitor and log usage of cloud resources for specific accounts. This usage can reflect a usage pattern that indicates normal and/or safe access behavior. For example, even though the policy 112 does not grant the account 110 access to the secured resource 108 at a time in the middle of the night, a usage pattern may reflect that the account 110 consistently accesses another cloud resource 106 in the middle of the night and this access did not cause any security issues. This may be a strong indicator to recommend the dynamic update 214 to the policy 112 because the risk is limited.

In yet another example, the user/device data 218 can include a device status profile that reflects recent changes to a device status related to preconfigured tasks. Going back to the example of the device 102 being a security camera, the preconfigured task may be to capture and process video of a building entrance during business hours (e.g., 7 am to 9 pm). The security camera may be motion activated in order to identify people entering and/or exiting the building. Accordingly, an account 110 executing on the security camera is provided access, via the policy 112, to the secured resource 108 during business hours due to inherent video storage limitations for a security camera. However, a company may host a late-night event on a specific date. On this date, many people are entering and/or exiting the building during non-business hours (9 pm-7 am). Accordingly, the security camera activates and requests access to the secured resource 108. However, a static policy would reject the access because it occurs outside the business hours, and thus, the access request is more likely to be a malicious actor.

Using the techniques described herein, the policy 112 can be dynamically updated so that the security camera can access the secured resource 108 during non-business hours while people are entering and exiting the building. The dynamic update can be based on a device status profile, which indicates that a substantial amount of video is being captured and processed. Moreover, a company calendar may indicate the occurrence of the late-night event. These are legitimate and justifiable reasons to dynamically update the policy.

The system data 220 may reflect recent changes to the secured resource 108 via a resource profile. For example, the resource profile may indicate that the secured resource 108 is a new cloud resource, that a service executing on the secured resource 108 is being scaled up and/or scaled down, that the secured resource 108 is going through a maintenance/repair process due to an unexpected event, and so forth. These may also be strong indicators to recommend the dynamic update 214 to the policy 112 because the risk is limited.

The proxy server 104 may continually access and retrieve the user/device data 218 from internal and/or external data sources 222. For example, the data sources 222 includes entity data such as human resources or employment records, working schedules, information technology databases, entity information, and so forth. Moreover, the proxy server 104 may continually access and retrieve the system data 220 from internal and/or external data sources 224. For example, the data sources 224 include cloud security analytic data, cloud resource availability and health data, and so forth. Consequently, the policy update module 204 can use input from various data sources 222 and 224 to determine to recommend a dynamic update 214 to the policy 112 when changes to the user/device data 218 and/or the system data 220 represent legitimate and justifiable reasons for dynamically updating the policy 112.

The machine learning algorithm 208 is configured to take the anomalous parameter 124 and one or both of the user/device data 218 and the system data 220 as inputs and output the risk value 210. It should be appreciated that any appropriate machine learning algorithm may be utilized, such as supervised learning, classification analysis, regression analysis, clustering, etc. One or more predictive models may also be utilized, such as Naïve Bayes, k-nearest neighbor algorithm, majority classifier, support vector machines, random forests, boosted trees, Classification and Regression Trees (CART), neural networks, ordinary least square, and so on.

Figure 2B:
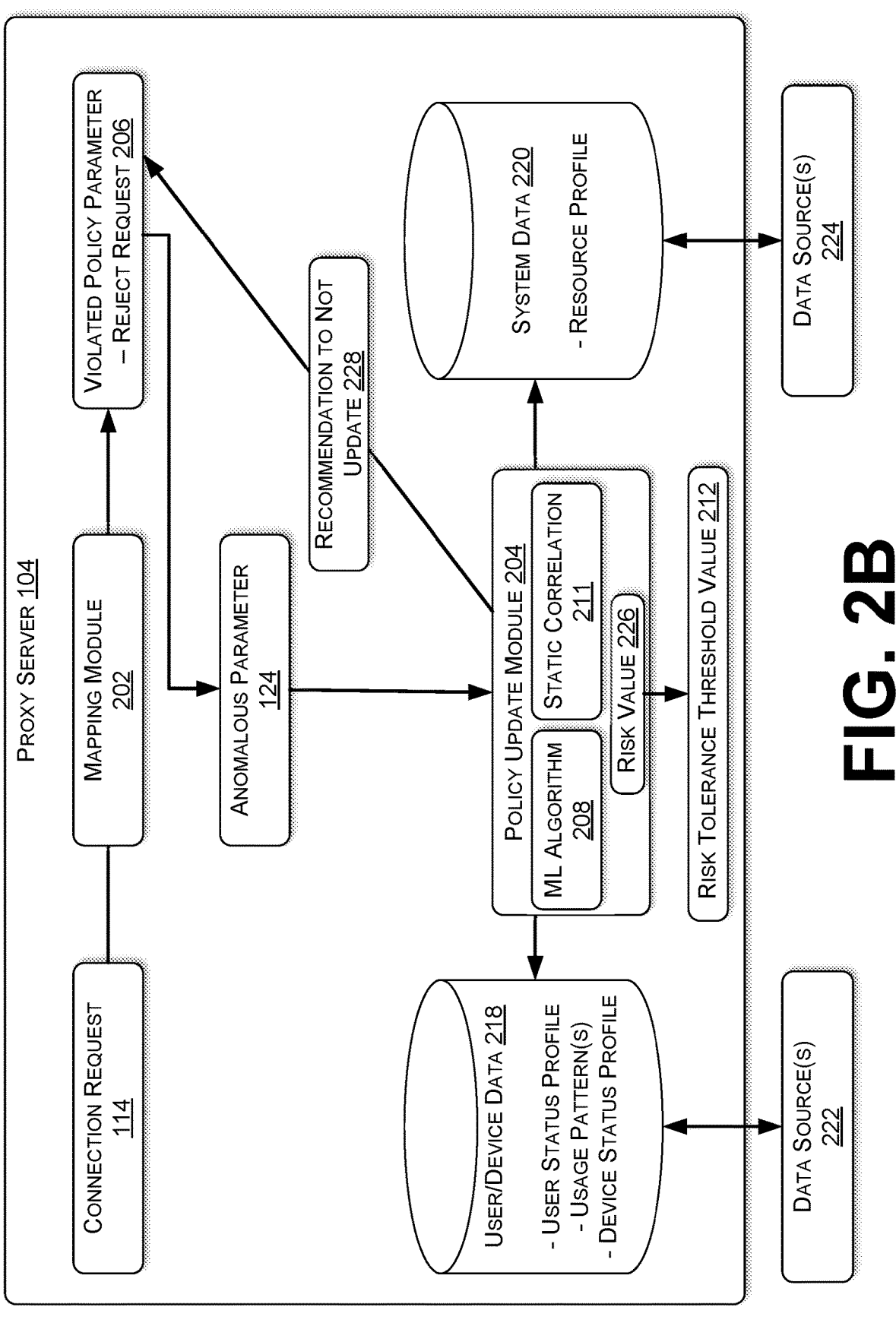
FIG. 2B also illustrates example components, associated with the proxy server, that are executable to determine that a policy cannot be dynamically updated to accommodate the anomalous parameter.

FIG. 2B illustrates the example components associated with the proxy server from FIG. 2A, but in this scenario they are executable to determine that the policy cannot be dynamically updated to accommodate the anomalous parameter. That is, in FIG. 2B a risk value 226 is determined to not satisfy the risk tolerance threshold value 212 (e.g., the risk value 226 is greater than or equal to the risk tolerance threshold value 212). Based on this determination, the policy update module 204 makes a recommendation not to update 228 the policy 112, and thus, the connection request 114 continues to be rejected as captured by element 206. Consequently, the proxy server 104 denies access to the secured resource 108.

In one example, if a recommendation to not update 228 is made, the policy update module 204 can implement a manual approval process that generates and sends a communication to a predefined account of a person authorized to manually approve an accommodation to the anomalous parameter (e.g., the supervisor of the user). If manual approval is received, the policy can then be updated to accommodate the anomalous parameter 124.

Accordingly, the techniques described herein are configured to determine whether a policy applied to an account that initiates a connection request for access to a cloud resource can be dynamically updated, rather than simply deny the connection request due to an anomalous parameter.

The number of illustrated modules in FIGS. 1, 2A, and 2B is just an example, and the number can vary higher or lower. That is, functionality described herein in association with the illustrated modules can be performed by a fewer number of modules or a larger number of modules on one device or spread across multiple devices (e.g., proxy servers).

FIG. 3A illustrates an example policy table 300 useable to allow or reject a connection request. As shown, the policy table 300 includes a column for an account identification 302, a column for authorized resources 304, a column for authorized devices 306, a column for authorized times 308, and a column for authorized locations 310. As described above, the policy table 300 is loaded into the proxy server 104 by the entity and/or an operator of the cloud platform.

A first entry in the policy table 300 is for Alice. Alice's policy grants her access to Web Server 1 and File Server 1 as long as (i) Alice logs in to her account via her laptop or smartphone between 7 am-7 pm and (ii) Alice's laptop or smartphone is located at company headquarters. A second entry in the policy table 300 is for Bob. Bob's policy grants him access to Web Server 1, File Server 1, and File Server 2 as long as Bob only logs in to his account via his laptop between 8 am-8 pm. In contrast to Alice, Bob's laptop can be located at company headquarters or at 1234 Main St. (which is a home address for Bob). A third entry in the policy table is for Security Camera A. Security Camera A's policy grants it access to File Server 3 between 7 am-9 pm and as long as it is located at company headquarters.

In this example scenario, if Alice decides to work late past 7 pm, a connection request to Web Server 1 will be rejected. However, via the techniques described herein, if recent changes to Alice's employment status or the status of Web Server 1 provide justifiable and legitimate reasons to grant access to Alice (e.g., Alice recently changed her work hours or there is an outage on Web Server 1), then Alice's policy will be updated to accommodate her working late. This is illustrated in FIG. 3B where the authorized time for Alice is dynamically updated to reflect 7 am-11 pm. In one example, the dynamic update to the policy is temporary (e.g., a one-time update that is reverted back to normal hours after the connection is terminated). In another example, the dynamic update to the policy is permanent such that Alice can continue to access the authorized resources between 7 am-11 pm on subsequent dates.

Furthermore, if Bob attempts to access File Server 1 using his entity-issued smartphone rather than his laptop, a connection request to File Server 1 will be rejected. However, via the techniques described herein, if Bob is associated with usage patterns that represent legitimate access to cloud resources using his smartphone (e.g., no security incidents were generated in the usage patterns), then Bob's policy will be updated to accommodate his use of the smartphone rather than the laptop. This is illustrated in FIG. 3B where the authorized devices for Bob are dynamically updated to reflect his smartphone.

In another example, if Security Camera A is continually motion activated to capture video associated with a late-night event, per the example described above, then Security Camera A's policy will be updated to accommodate access to File Server 3 until 1am. This is also illustrated in FIG. 3B.

It is noted that user and device identifications and/or cloud resources are referred to and identified individually above (e.g., Bob, Alice, Security Camera A, Web Server 1, File Server 1, File Server 2). However, it is contemplated in the context of this disclosure that a policy can be applied to a group of users that share an attribute (e.g., day-time engineers on the transaction processing team) and/or a group identification. Moreover, it is contemplated in the context of this disclosure that a cloud resource (e.g., a server, a virtual machine) can also be part of a group of resources that share a group identification. Note that in some embodiments, additional parameters may be included in policy table 300. For example, Alice may have a role of Administrator, and Bob may have a role of User. This may limit Bob from running certain commands. Additional embodiments of policy table 300 may set a limited time window for how long Alice, Bob, or others may access resources in order to, for example, reduce the potential security footprint. Additional embodiments of policy table 300 may have limited command sets that a given account is allowed to run. This may reduce the security footprint.

Figure 4:
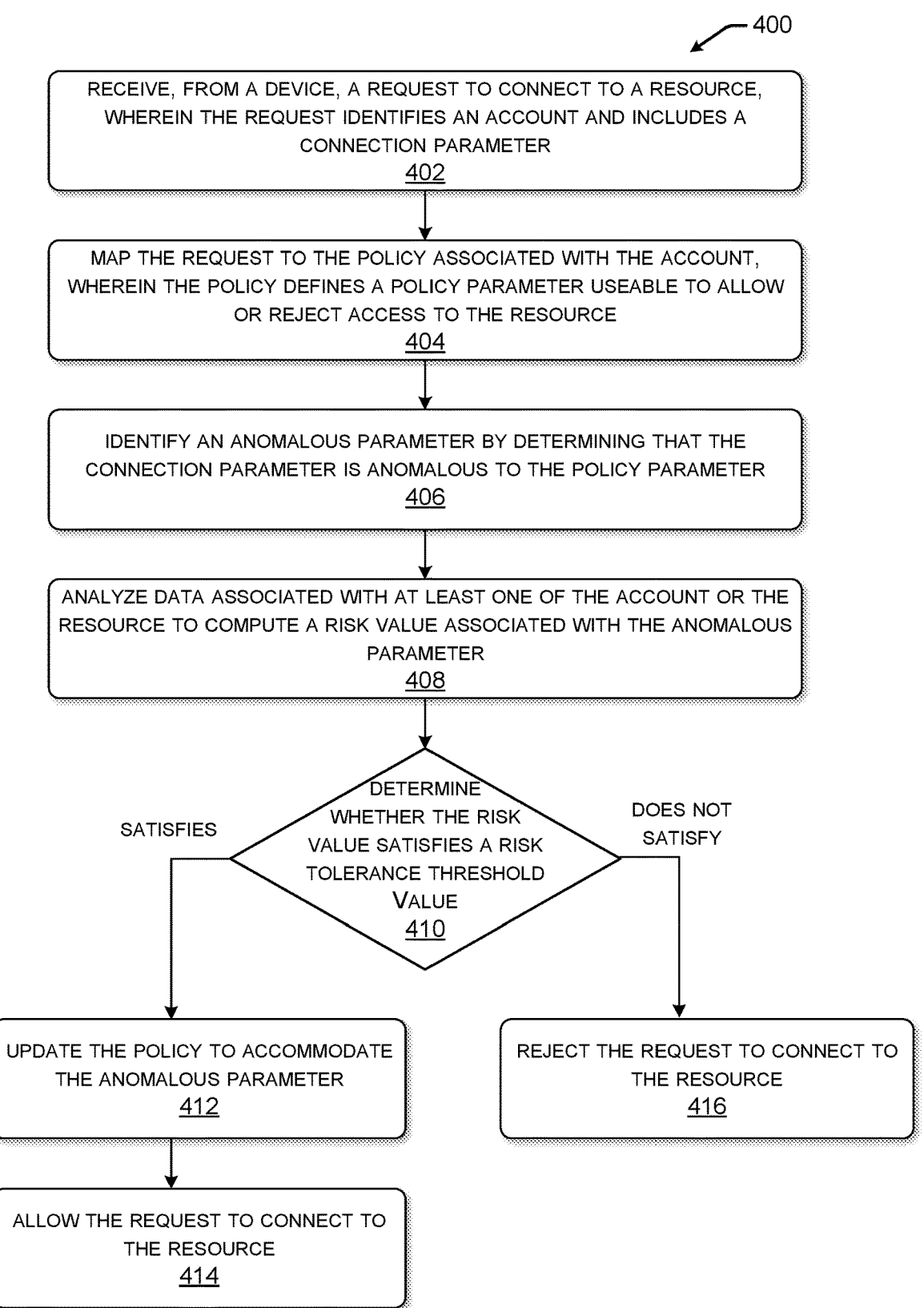
FIG. 4 is an example flow diagram showing aspects of a method for determining whether a policy can be dynamically updated to accommodate an anomalous parameter.

Turning now to FIG. 4, aspects of a method 400 for determining whether a policy can be dynamically updated to accommodate an anomalous parameter are shown and described. In various examples, the operations of the method 400 shown in FIG. 4 are performed by the proxy server 104. With reference to FIG. 4, the method 400 beings at operation 402 where the proxy server receives, from a device, a request to connect to a resource. As described above, the request identifies the account and includes a connection parameter. At operation 404, the proxy server maps the request to the policy associated with the account. The policy defines a policy parameter useable to allow or reject access to the resource.

At operation 406, the proxy server identifies an anomalous parameter by determining that the connection parameter is anomalous to the policy parameter. At operation 408, the proxy server analyzes data associated with at least one of the account or the resource to compute a risk value associated with the anomalous parameter.

At operation 410, the proxy server determines whether the risk value satisfies a risk tolerance threshold value. If the risk value satisfies the risk tolerance threshold, the process proceeds to operation 412 where the proxy server updates the policy to accommodate the anomalous parameter. In some embodiments, this system is integrated to a corporate review and approval system. As a part of operation 412, the updated information is sent to an administrator, manager, or other authority notification. In some embodiments, approval is required. Then at operation 414, the proxy server allows the request to connect to the resource.

If the risk value does not satisfy the risk tolerance threshold value at operation 410, the process proceeds to operation 416 where the proxy server rejects the request to connect to the resource.

For ease of understanding, the process discussed in this disclosure is delineated as separate operations represented as independent blocks. However, these separately delineated operations should not be construed as necessarily order dependent in their performance. The order in which the process is described is not intended to be construed as a limitation, and any number of the described process blocks may be combined in any order to implement the process or an alternate process. Moreover, it is also possible that one or more of the provided operations is modified or omitted.

The particular implementation of the technologies disclosed herein is a matter of choice dependent on the performance and other requirements of a computing device. Accordingly, the logical operations described herein may be referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated method can end at any time and need not be performed in its entirety. Some or all operations of the method, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system.

Figure 5:
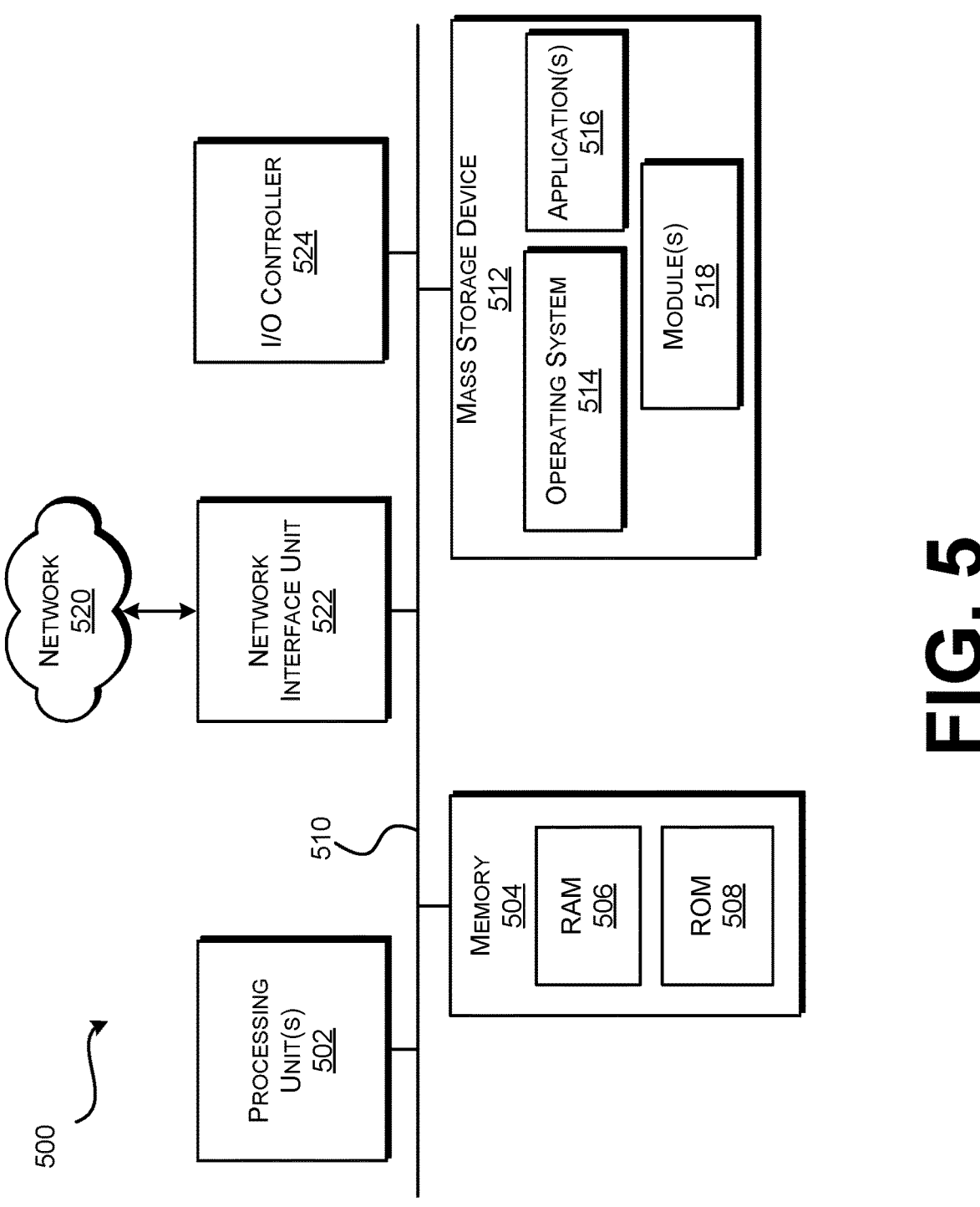
FIG. 5 is a computer architecture diagram showing an illustrative computer hardware and software architecture for a computing system capable of implementing aspects of the techniques and technologies presented herein.

FIG. 5 shows additional details of an example computer architecture 500 for a device, such as a computer or a server capable of executing computer instructions (e.g., a module or a program component described herein). The computer architecture 500 illustrated in FIG. 5 includes processing unit(s) 502, a system memory 504, including a random-access memory 506 (RAM) and a read-only memory (ROM) 508, and a system bus 510 that couples the memory 504 to the processing unit(s) 502. The processing units 502 may also comprise or be part of a processing system. In various examples, the processing units 502 of the processing system are distributed. Stated another way, one processing unit 502 of the processing system may be located in a first location (e.g., a rack within a datacenter) while another processing unit 502 of the processing system is located in a second location separate from the first location.

Processing unit(s), such as processing unit(s) 502, can represent, for example, a CPU-type processing unit, a GPU-type processing unit, a field-programmable gate array (FPGA), another class of digital signal processor (DSP), or other hardware logic components that may, in some instances, be driven by a CPU. For example, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), and the like.

A basic input/output system containing the basic routines that help to transfer information between elements within the computer architecture 500, such as during startup, is stored in the ROM 508. The computer architecture 500 further includes a mass storage device 512 for storing an operating system 514, application(s) 516, modules 518, and other data described herein.

The mass storage device 512 is connected to processing unit(s) 502 through a mass storage controller connected to the bus 510. The mass storage device 512 and its associated computer-readable media provide non-volatile storage for the computer architecture 500. Although the description of computer-readable media contained herein refers to a mass storage device, it should be appreciated by those skilled in the art that computer-readable media can be any available computer-readable storage media or communication media that can be accessed by the computer architecture 500.

Computer-readable media includes computer-readable storage media and/or communication media. Computer-readable storage media includes one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including RAM, static RAM (SRAM), dynamic RAM (DRAM), phase change memory (PCM), ROM, erasable programmable ROM (EPROM), electrically EPROM (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer-readable storage media, communication media can embody computer-readable instructions, data structures, program modules, or other data in a modulated data signal, such as a carrier wave, or other transmission mechanism. As defined herein, computer storage media does not include communication media. That is, computer-readable storage media does not include communications media consisting solely of a modulated data signal, a carrier wave, or a propagated signal, per se.

According to various configurations, the computer architecture 500 may operate in a networked environment using logical connections to remote computers through the network 520. The computer architecture 500 may connect to the network 520 through a network interface unit 522 connected to the bus 510.

It should be appreciated that the software components described herein may, when loaded into the processing unit(s) 502 and executed, transform the processing unit(s) 502 and the overall computer architecture 500 from a general-purpose computing system into a special-purpose computing system customized to facilitate the functionality presented herein. The processing unit(s) 502 may be constructed from any number of transistors or other discrete circuit elements, which may individually or collectively assume any number of states. More specifically, the processing unit(s) 502 may operate as a finite-state machine, in response to executable instructions contained within the software modules disclosed herein. These computer-executable instructions may transform the processing unit(s) 502 by specifying how the processing unit(s) 502 transition between states, thereby transforming the transistors or other discrete hardware elements constituting the processing unit(s) 502.

Figure 6:
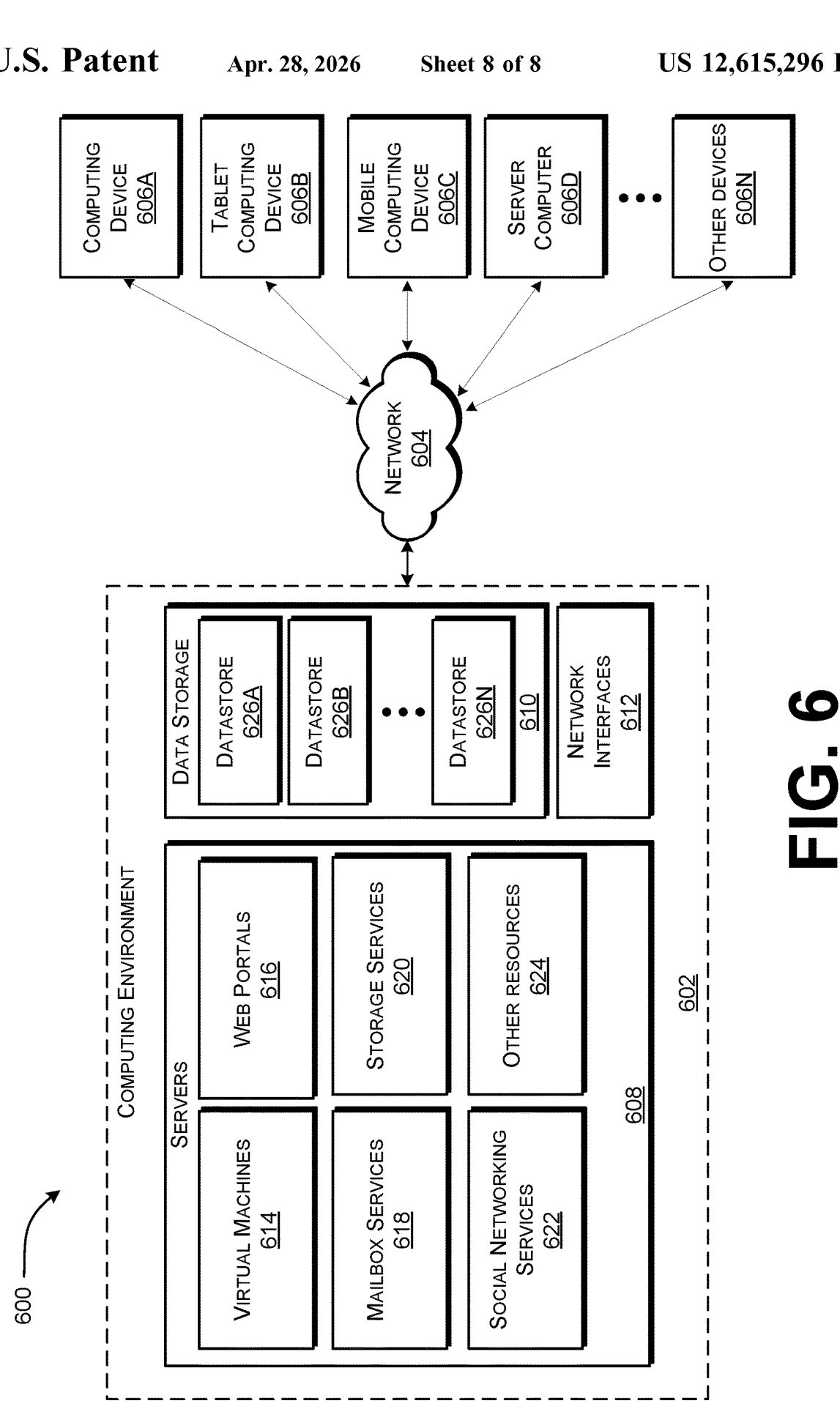
FIG. 6 is a diagram illustrating an example distributed computing environment capable of implementing aspects of the techniques and technologies presented herein.

FIG. 6 depicts an illustrative distributed computing environment 600 capable of executing the software components described herein. Thus, the distributed computing environment 600 illustrated in FIG. 6 can be utilized to execute any aspects of the software components presented herein. For example, the distributed computing environment 600 can be utilized to execute aspects of the software components described herein. Accordingly, the distributed computing environment 600 can include a computing environment 602 operating on, in communication with, or as part of the network 604. The network 604 can include various access networks. One or more client devices 606A-606N (hereinafter referred to collectively and/or generically as "computing devices 606") can communicate with the computing environment 602 via the network 604. In one illustrated configuration, the computing devices 606 include a computing device 606A such as a laptop computer, a desktop computer, or other computing device; a slate or tablet computing device 606B; a mobile computing device 606C such as a mobile telephone, a smart phone, or other mobile computing device; a server computer 606D; and/or other devices 606N. It should be understood that any number of computing devices 606 can communicate with the computing environment 602.

In various examples, the computing environment 602 includes servers 608, data storage 610, and one or more network interfaces 612. The servers 608 can host various services, virtual machines, portals, and/or other resources. In the illustrated configuration, the servers 608 host virtual machines 614, Web portals 616, mailbox services 618, storage services 620, and/or social networking services 622. As shown in FIG. 6 the servers 608 also can host other services, applications, portals, and/or other resources ("other resources") 624.

As mentioned above, the computing environment 602 can include the data storage 610. According to various implementations, the functionality of the data storage 610 is provided by one or more databases operating on, or in communication with, the network 604. The functionality of the data storage 610 also can be provided by one or more servers configured to host data for the computing environment 600. The data storage 610 can include, host, or provide one or more real or virtual datastores 626A-626N (hereinafter referred to collectively and/or generically as "datastores 626"). The datastores 626 are configured to host data used or created by the servers 608 and/or other data. That is, the datastores 626 also can host or store web page documents, word documents, presentation documents, data structures, algorithms for execution by a recommendation engine, and/or other data utilized by any application program. Aspects of the datastores 626 may be associated with a service for storing files.

The computing environment 602 can communicate with, or be accessed by, the network interfaces 612. The network interfaces 612 can include various types of network hardware and software for supporting communications between two or more computing devices including the computing devices and the servers. It should be appreciated that the network interfaces 612 also may be utilized to connect to other types of networks and/or computer systems.

It should be understood that the distributed computing environment 600 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 600 provides the software functionality described herein as a service to the computing devices. It should be understood that the computing devices can include real or virtual machines including server computers, web servers, personal computers, mobile computing devices, smart phones, and/or other devices. As such, various configurations of the concepts and technologies disclosed herein enable any device configured to access the distributed computing environment 600 to utilize the functionality described herein for providing the techniques disclosed herein, among other aspects.

The disclosure presented herein also encompasses the subject matter set forth in the following clauses.

Example Clause A, a method comprising: receiving, from a device, a request to connect to a resource, wherein the request identifies an account and includes a connection parameter; mapping the request to a policy associated with the account, wherein the policy defines a policy parameter useable to allow or reject access to the resource; identifying an anomalous parameter by determining that the connection parameter is anomalous to the policy parameter; computing a risk value associated with the anomalous parameter by analyzing data associated with the account or the resource; determining that the risk value satisfies a risk tolerance threshold value; updating the policy to accommodate the anomalous parameter; and allowing the request to connect to the resource based on the updating the policy to accommodate the anomalous parameter.

Example Clause B, the method of Example Clause A, wherein: the connection parameter includes a first device identification that is not authorized to connect to the resource via the account and the policy parameter includes a second device identification that is authorized to connect to the resource via the account; and updating the policy to accommodate the anomalous parameter comprises adding an authorization for the first device identification to connect to the resource.

Example Clause C, the method of Example Clause A, wherein: the connection parameter includes a first device location from which access to the resource via the account is not authorized and the policy parameter includes a second device location from which access to the resource via the account is authorized; and updating the policy to accommodate the anomalous parameter comprises adding an authorization for the first device location to access the resource.

Example Clause D, the method of Example Clause A, wherein: the connection parameter includes a first time at which access to the resource via the account is not authorized and the connection parameter includes a second time at which access to the resource via the account is authorized; and updating the policy to accommodate the anomalous parameter comprises adding an authorization for the first time to access the resource.

Example Clause E, the method of any one of Example Clauses A through D, wherein analyzing the data associated with at least one of the account or the resource comprises applying a machine learning algorithm to compute the risk value.

Example Clause F, the method of any one of Example Clauses A through E, wherein the data comprises user data indicative of a change in status for a user of the account.

Example Clause G, the method of any one of Example Clauses A through F, wherein the data comprises system data indicative of a status of the resource.

Example Clause H, the method of any one of Example Clauses A through G, wherein the policy is specifically defined for the account.

Example Clause I, the method of any one of Example Clauses A through G, wherein the policy is defined for a group of accounts that shares a common attribute.

Example Clause J, a system comprising: a processing system; and a computer-readable medium having encoded thereon computer-readable instructions that when executed by the processing system cause the system to: receive a request to connect to a resource, wherein the request identifies an account and includes a connection parameter; map the request to a policy associated with the account, wherein the policy defines a policy parameter useable to allow or reject access to the resource; identify an anomalous parameter by determining that the connection parameter is anomalous to the policy parameter; associate the anomalous parameter with a risk value; determine that the risk value satisfies a risk tolerance threshold value; update the policy to accommodate the anomalous parameter; and allow the request to connect to the resource based on the updating the policy to accommodate the anomalous parameter.

Example Clause K, the system of Example Clause J, wherein: the connection parameter includes a first device identification that is not authorized to connect to the resource via the account and the policy parameter includes a second device identification that is authorized to connect to the resource via the account; and updating the policy to accommodate the anomalous parameter comprises adding an authorization for the first device identification to connect to the resource.

Example Clause L, the system of Example Clause J, wherein: the connection parameter includes a first device location from which access to the resource via the account is not authorized and the policy parameter includes a second device location from which access to the resource via the account is authorized; and updating the policy to accommodate the anomalous parameter comprises adding an authorization for the first device location to access the resource.

Example Clause M, the system of Example Clause J, wherein: the connection parameter includes a first time at which access to the resource via the account is not authorized and the connection parameter includes a second time at which access to the resource via the account is authorized; and updating the policy to accommodate the anomalous parameter comprises adding an authorization for the first time to access the resource.

Example Clause N, the system of any one Example Clauses J through M, wherein the computer-readable instructions further cause the system to apply a machine learning algorithm to data associated with at least one of the account or the resource to compute the risk value.

Example Clause O, the system of Example Clause N, wherein the data comprises user data indicative of a change in status for a user of the account.

Example Clause P, the system of Example Clause N or Example Clause O, wherein the data comprises system data indicative of a status of the resource.

Example Clause Q, a system comprising: a processing system; and a computer-readable medium having encoded thereon computer-readable instructions that when executed by the processing system cause the system to: receive a request to connect to a resource, wherein the request identifies an account and includes a connection parameter; map the request to a policy associated with the account, wherein the policy defines a policy parameter useable to allow or reject access to the resource; identify an anomalous parameter by determining that the connection parameter is anomalous to the policy parameter; associate the anomalous parameter with a risk value; determine that the risk value does not satisfy a risk tolerance threshold value; reject the request to connect to the resource based on the determining that the risk value does not satisfy a risk tolerance threshold value; and send a communication to a predefined account associated with a user that can manually approve the request to connect to the resource.

Example Clause R, the system of Example Clause Q, wherein the connection parameter includes a first device location from which access to the resource via the account is not authorized and the policy parameter includes a second device location from which access to the resource via the account is authorized.

Example Clause S, the system of Example Clause Q, wherein the connection parameter includes a first time at which access to the resource via the account is not authorized and the connection parameter includes a second time at which access to the resource via the account is authorized.

Example Clause T, the system of Example Clause Q, wherein the connection parameter includes a first device identification that is not authorized to connect to the resource via the account and the policy parameter includes a second device identification that is authorized to connect to the resource via the account.

While certain example embodiments have been described, these embodiments have been presented by way of example only and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated that any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different policies).

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

17
18

What is claimed is:

1. A method comprising:

receiving, from a device, a request to connect to a resource, wherein the request identifies an account and includes a connection parameter;

mapping the request to a policy associated with the account, wherein the policy defines a policy parameter useable to allow or reject access to the resource;

identifying an anomalous parameter by determining that the connection parameter is anomalous to the policy parameter;

computing a risk value associated with the anomalous parameter by analyzing a change to a user status profile associated with the account, the change legitimizing a connection to the resource in association with the anomalous parameter;

determining that the risk value satisfies a risk tolerance threshold value;

in response to determining that the risk value satisfies the risk tolerance threshold value, updating the policy to accommodate the anomalous parameter by adding, to the policy, information associated with the connection parameter that is determined to be anomalous to the policy parameter; and allowing the connection to the resource based on the updating the policy to accommodate the anomalous parameter.

2. The method of claim 1, wherein:

the connection parameter includes a first device identification that is not authorized to connect to the resource via the account and the policy parameter includes a second device identification that is authorized to connect to the resource via the account; and updating the policy to accommodate the anomalous parameter comprises adding an authorization for the first device identification to connect to the resource.

3. The method of claim 1, wherein:

the connection parameter includes a first device location from which access to the resource via the account is not authorized and the policy parameter includes a second device location from which access to the resource via the account is authorized; and updating the policy to accommodate the anomalous parameter comprises adding an authorization for the first device location to access the resource.

4. The method of claim 1, wherein:

the connection parameter includes a first time at which access to the resource via the account is not authorized and the connection parameter includes a second time at which access to the resource via the account is authorized; and updating the policy to accommodate the anomalous parameter comprises adding an authorization for the first time to access the resource.

5. The method of claim 1, wherein analyzing the change to the user status profile associated with the account comprises applying a machine learning algorithm to compute the risk value.

6. The method of claim 1, wherein the policy is specifically defined for the account.

7. The method of claim 1, wherein the policy is defined for a group of accounts that shares a common attribute.

8. The method of claim 1, wherein the change to the user status profile indicates at least one of a new employment position or a new employment responsibility.

9. The method of claim 1, wherein the change to the user status profile indicates at least one of different user work hours, different user work locations, or different user work devices.

10. A system comprising:

a processing system; and a computer-readable storage medium having encoded thereon computer-readable instructions that when executed by the processing system cause the system to:

receive a request to connect to a resource, wherein the request identifies an account and includes a connection parameter;

map the request to a policy associated with the account, wherein the policy defines a policy parameter useable to allow or reject access to the resource;

identify an anomalous parameter by determining that the connection parameter is anomalous to the policy parameter;

associate the anomalous parameter with a risk value computed based on a change to a user status profile associated with the account, the change legitimizing a connection to the resource in association with the anomalous parameter;

determine that the risk value satisfies a risk tolerance threshold value;

in response to determining that the risk value satisfies the risk tolerance threshold value, update the policy to accommodate the anomalous parameter by adding, to the policy, information associated with the connection parameter that is determined to be anomalous to the policy parameter; and allow the connection to the resource based on the updating the policy to accommodate the anomalous parameter.

11. The system of claim 10, wherein:

the connection parameter includes a first device identification that is not authorized to connect to the resource via the account and the policy parameter includes a second device identification that is authorized to connect to the resource via the account; and updating the policy to accommodate the anomalous parameter comprises adding an authorization for the first device identification to connect to the resource.

12. The system of claim 10, wherein:

the connection parameter includes a first device location from which access to the resource via the account is not authorized and the policy parameter includes a second device location from which access to the resource via the account is authorized; and updating the policy to accommodate the anomalous parameter comprises adding an authorization for the first device location to access the resource.

13. The system of claim 10, wherein:

the connection parameter includes a first time at which access to the resource via the account is not authorized and the connection parameter includes a second time at which access to the resource via the account is authorized; and updating the policy to accommodate the anomalous parameter comprises adding an authorization for the first time to access the resource.

14. The system of claim 10, wherein the computer-readable instructions further cause the system to apply a machine learning algorithm to the change to the user status profile associated with the account to compute the risk value.

15. The system of claim 10, wherein the change to the user status profile indicates at least one of a new employment position or a new employment responsibility.

16. The system of claim 10, wherein the change to the user status profile indicates at least one of different user work hours, different user work locations, or different user work devices.

17. A computer-readable storage medium having encoded thereon computer- readable instructions that when executed by a processing system cause a system to:

receive a request to connect to a resource, wherein the request identifies an account and includes a connection parameter;

map the request to a policy associated with the account, wherein the policy defines a policy parameter useable to allow or reject access to the resource;

identify an anomalous parameter by determining that the connection parameter is anomalous to the policy parameter;

associate the anomalous parameter with a risk value computed based on a change to a user status profile associated with the account, the change legitimizing a connection to the resource in association with the anomalous parameter;

determine that the risk value satisfies a risk tolerance threshold value;

in response to determining that the risk value satisfies the risk tolerance threshold value, update the policy to accommodate the anomalous parameter by adding, to the policy, information associated with the connection parameter that is determined to be anomalous to the policy parameter; and allow the connection to the resource based on the updating the policy to accommodate the anomalous parameter.

18. The computer-readable storage medium of claim 17, wherein:

the connection parameter includes a first device identification that is not authorized to connect to the resource via the account and the policy parameter includes a second device identification that is authorized to connect to the resource via the account; and updating the policy to accommodate the anomalous parameter comprises adding an authorization for the first device identification to connect to the resource.

19. The computer-readable storage medium of claim 17, wherein:

the connection parameter includes a first device location from which access to the resource via the account is not authorized and the policy parameter includes a second device location from which access to the resource via the account is authorized; and updating the policy to accommodate the anomalous parameter comprises adding an authorization for the first device location to access the resource.

20. The computer-readable storage medium of claim 17, wherein:

the connection parameter includes a first time at which access to the resource via the account is not authorized and the connection parameter includes a second time at which access to the resource via the account is authorized; and updating the policy to accommodate the anomalous parameter comprises adding an authorization for the first time to access the resource.

\* \* \* \* \*